United States Patent

Harris

Patent Number: 4,992,509
Date of Patent: Feb. 12, 1991

[54] POLYVINYL ACETAL RESIN, USE THEREOF AS AN ADHESION PROMOTING ADDITIVE, METHOD OF PRODUCING SAME, AND ADHESIVE COMPOSITION COMPRISING SAME

[75] Inventor: Stephen J. Harris, Dublin

[73] Assignee: Loctite Corporation, Newington, Conn.

[21] Appl. No.: 252,831

[22] Filed: Oct. 3, 1988

[30] Foreign Application Priority Data

Oct. 7, 1987 [IE] Ireland ................... 2674/87

[51] Int. Cl.$^5$ ................................ C08F 8/00
[52] U.S. Cl. ......................... 525/59; 525/60; 525/61
[58] Field of Search ................... 525/59, 60, 61

[56] References Cited

U.S. PATENT DOCUMENTS

| | | | |
|---|---|---|---|
| 3,647,756 | 3/1972 | Okaya et al. | 525/61 |
| 4,130,518 | 12/1978 | Rybny et al. | 525/59 |
| 4,523,983 | 6/1985 | Lin | 525/59 |
| 4,710,539 | 12/1987 | Siudat et al. | 525/59 |

FOREIGN PATENT DOCUMENTS 0028893 7/1974 Japan ..................... 525/59

Primary Examiner—Joseph L. Schofer
Assistant Examiner—J. M. Reddick
Attorney, Agent, or Firm—Vidas & Arrett

[57] ABSTRACT

Polyvinyl acetal resin, use thereof as an adhesion promoting additive, method of producing same, and adhesive composition comprising same An acrylate- or methacrylate-substituted polyvinyl acetal resin of formula I:

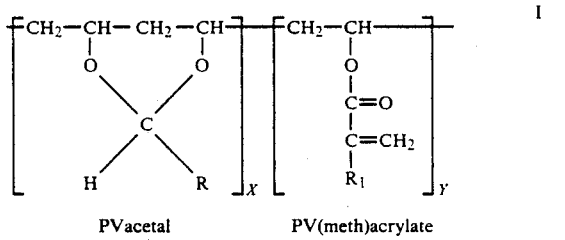
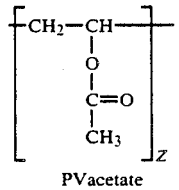

wherein the weight percentages of the X, Y and Z groups are variable,

R is a hydrogen atom or an alkyl group, and
$R_1$ is hydrogen atom or a methyl group, is described.

The resin of formula I is produced by acrylating or methacrylating a polyvinyl acetal resin of formula II:

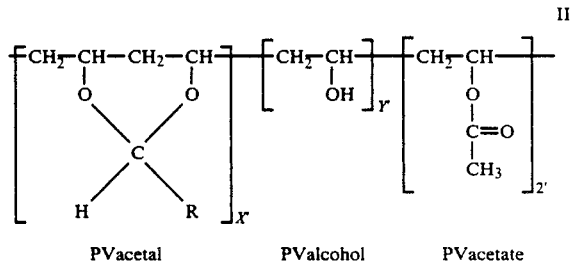

in which the weight percentages of the X', Y' and Z' groups are variable, particularly in the range 68 to 88% X, 6 to 19% Y' and 1 to 26% Z.

The compounds of formula I are used to promote adhesion of acrylate or methacrylate ester based adhesive compositions to polyester plastic substrates.

10 Claims, No Drawings

POLYVINYL ACETAL RESIN, USE THEREOF AS AN ADHESION PROMOTING ADDITIVE, METHOD OF PRODUCING SAME, AND ADHESIVE COMPOSITION COMPRISING SAME

BACKGROUND OF THE INVENTION

1. Field of the Invention

The present invention relates to a substituted polyvinyl acetal resin, to use thereof as an additive for promoting adhesion of acrylate or methacrylate ester based products to polyester plastic substrates, and to a method of producing such an additive. The invention also relates to an adhesive composition for use on polyester plastic substrates.

2. Description of the Related Art

Adhesion of acrylate or methacrylate compositions to plastic substrates has long been a problem. Many approaches to overcoming this problem have been undertaken. The first approach concerns the alteration or modification of the plastic surface prior to application of the composition by, for example, etching with, for example, haloacids (U.S. Pat. No. 2,801,447, L. E. Wolinski), flame treatment (E. F. Buchel, British Plastics 37 (1964) p142), corona discharge treatment (J. C. Von der Heide & H. L. Wilson, Modern Plastics 38 9 (1961) p199), solvent treatments (R. M. Herman, Modern Plastics 39 5 (1962) p153) and high energy radiation treatments (Practising Polymer Surface Chemistry. D. Dwight, Chemtech. (March 1982) p166). Other approaches include the use of additives, for example, polyvinylacetate has been proposed for use as an additive with ultraviolet light curing acrylate or methacrylate compositions in U.S. Pat. No. 3996394, E. B. Harris.

OBJECT OF THE INVENTION

It is an object of the present invention to provide an adhesion promoting additive which promotes the adhesion of plastic to plastic. In particular it is an object of the invention to provide an adhesion promoting additive which promotes adhesion of acrylate or methacrylate ester compositions to a polycondensation product of 1,4-butanediol and dimethyl terephthalate, such as is sold under the Trade Mark VALOX and is used in making electronic trimmers in the microelectronics industry. It is a further object of the invention to provide an adhesive composition for use on plastic substrates.

SUMMARY OF THE INVENTION

According to the present invention there is provided an acrylate- or methacrylate-substituted polyvinyl acetal resin of formula I:

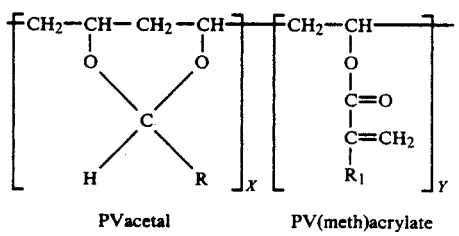

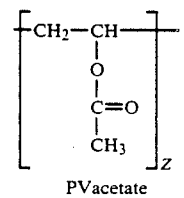

wherein the weight percentages of the X, Y and Z groups are variable,

R is a hydrogen atom or an alkyl group, and $R_1$ is a hydrogen atom or a methyl group.

Preferably the weight percentages of the X, Y and Z groups vary in the range 54 to 70% X, 10 to 36% Y and 0 to 20% Z.

The invention also relates to a method of producing the said substituted polyvinyl acetal resin of formula I wherein a polyvinyl acetal resin of formula II:

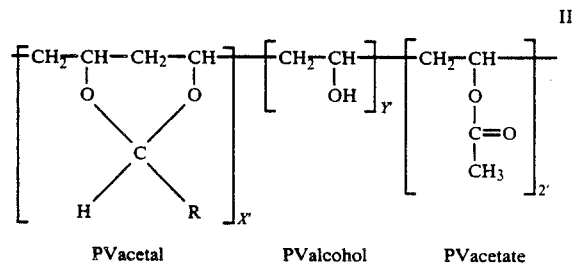

in which the weight percentages of the X', Y' and Z' groups are variable, and R is a hydrogen atom or an alkyl group; is acrylated or methacrylated to produce an acrylate- or methacrylate-substituted polyvinyl acetal resin of formula I.

Preferably the weight percentages of the X', Y' and Z' groups vary in the range 68 to 88% X', 6 to 19% Y' and 1 to 26% Z'.

Polyvinyl acetal resins of formula II suitable for use in the method of preparing the resins of formula I preferably have a molecular weight of between 350 and 3500 and most preferably have a molecular weight of between 350 and 900. Preferred polyvinyl acetal resins of formula II are polyvinyl butyral resins and polyvinyl formal resins; the most preferred being Formvar 7/95E (Trade Mark), which is commercially available from Monsanto Company.

The invention further relates to an adhesive composition for use on plastic substrates comprising: (a) acrylate or methacrylate monomeric material, and (b) an acrylate- or methacrylate-substituted polyvinyl acetal resin of formula I above. Preferably, the acrylate- or methacrylate-substituted polyvinyl acetal resin comprises from 1 to 25 weight percent of the total composition and most preferably it comprises from 1 to 10 weight percent of the total composition.

In another aspect the invention relates to an adhesion-promoting additive for acrylate or methacrylate ester compositions comprising an acrylate - or -methacrylate-substituted polyvinyl acetal resin of formula I:

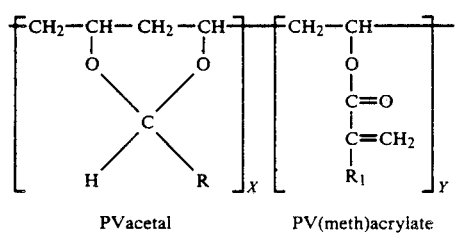

PVacetal     PV(meth)acrylate

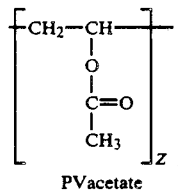

PVacetate wherein the weight percentages of the X, Y and Z groups are variable,

R is a hydrogen atom or an alkyl group, and $R_1$ is a hydrogen atom or a methyl group.

The substitution of acrylate or methacrylate groups onto the polyvinyl acetal resin renders the resin soluble in the acrylate or methacrylate monomeric material and enables the resin to copolymerise therewith. It is a particular advantage of the present invention that compositions can be produced which are curable by ultraviolet light, in addition to compositions which are curable by heat.

Compounds of formula II are commercially available from Monsanto Company with different relative X', Y' and Z' contents, and with widely varying molecular weights (Polyvinyl Acetal Adhesives by. E. Lavin & J. A. Snelgrove, in Handbook of Adhesives, 2nd edition, (ed) I. Skeist. Van Nostrand Reinhold Co. 1962 p507). However, such compounds are generally difficult to dissolve in non-polar acrylates or methacrylates. It is preferred to use a lower molecular weight polyvinyl formal such as Formvar 7/95E since the lower the molecular weight product formed therefrom by acrylation or methacrylation, the higher would be the expected solubility in the monomeric material. In the case of Formvar 7/95E the weight percentage of X'=82%, Y'=6% and Z'=12% and the weight average degree of polymerisation is approximately 350.

Other suitable polyvinyl acetal resins have compositions of X', Y' and Z' varying in the range 68 to 88% X', 6 to 19% Y', and 1 to 26% Z', and have weight average degrees of polymerization which vary between 350 and 3500.

DESCRIPTION OF THE PREFERRED EMBODIMENTS

Example 1

To 500 ml dry 1,2-dichloroethane was added 10g of powdered 3 A molecular sieves, 10mg hydroquinone and 11.4g (0.109 mole) methacryloyl chloride. Finally, 7.3g polyvinyl formal (Formvar 7/95E from Monsanto Company) was added and the reaction mixture was then refluxed under dry nitrogen for 120 hr. This method follows that described for clean methacrylation of alcohols, J. Org. Chem. 42 No. 24 1977 p3965. The reaction mixture was cooled to room temperature, then filtered, and solvent and excess methacryloyl chloride were removed under reduced pressure to give a colourless solid, which was dissolved in dichloromethane and then reprecipitated in 40°-60° C. petroleum spirit. This procedure was repeated to give, after drying under vacuum, 8.5g white fluffy product characterised by I. R. spectroscopy as fully methacrylate-substituted polyvinyl formal resin equivalent to Formvar 7/95E. I.R. spectroscopy results: no $\gamma 3460 cm^{-1}$ due to C-OH of starting material; $\gamma 1630$ (w) $cm^{-1}$ C=C.

Example 2

The procedure followed was the same as in Example 1 except that 9.85g (0.109 mole) acryloyl chloride was used in place of methacryloyl chloride. The yield of colourless fluffy product was 8.1g after reprecipitation and drying. The product was characterised by infra-red spectroscopy as the fully acrylated product.

I.R. spectroscopy results : no $\gamma 3460$ $cm^{-1}$ due to C-OH of starting material; $\gamma 1630$ (w) $cm^{-1}$ C=C.

Example 3

Tests were carried out with an adhesive formulation based on 36.4% by weight dihydrodicyclo- pentadienyloxyethyl methacrylate, 2.5% acrylic acid, 53.0% monomer A, 1.1% glycidoxypropyl trimethoxysilane, 1.0% saccharin and 2.9% t-butyl perbenzoate. Monomer A is a urethane methacrylate prepared by reacting two moles of 2,4-toluene diisocyanate with one mole of poly(1,6-hexane/ neopentyladipate) (Lexorez 1400-120 which is commercially available from Inolex Corp. USA) and further reacting with two moles of hydroxyethyl methacrylate. The methacrylate polyvinyl formal of Example 1 or acrylate polyvinyl formal of Example 2 at the level indicated in Table 1 was added to the adhesive formulation with stirring until dissolved, and the resulting product was applied between flat pieces of Valox 310-SEO and the tensile shear strength was measured at zero gap after curing for 2 hours at 120° C. The material on which the bonding tests were carried out was a thermoplastic polyester resin known as Valox 310-SEO, a polycondensation product of 1,4-butanediol and dimethyl terephthalate available from General Electric Company. Bonds were made with quarter inch (6mm) overlap on 1 inch (2.5cm) wide Valox lapshears.

Example 4

Further tests were carried out with an adhesive composition based on 33.5% by weight X-131 urethane acrylate (Hans Rahn & Co.), 35.4% Photomer 6052 urethane acrylate (Diamond Shamrock Corporation), 9.2% Ebecryl 220 urethane acrylate (U.C.B. Belgium), 9.1% hydroxypropyl methacrylate, 4.6% acrylic acid, 0.6% glycidoxypropyl trimethoxysilane, 1.0% saccharin and 2.9% t-butyl perbenzoate. The level of acrylate or methacrylate polyvinyl formal indicated in Table 1 was added and the formulation was tested as in Example 3.

Example 5

Tests were carried out on a threadlocking composition based on 90.2% by weight triethyleneglycol dimethacrylate, 1.6% saccharin, 0.6% N,N-diethyl-p-toluidine and 0.3% N,N-dimethyl-o-toluidine and 3.0% cumene hydroperoxide. The level of methacrylated polyvinyl formal indicated in Table 1 was added and the formulation was tested as in Example 3.

The results of the tests in Examples 3, 4 and 5 are set out in Table 1.

TABLE 1

| Composition | Additive | 82° C. Stability | Tensile Shear strength daNcm$^{-2}$2hr/120° C. Cure on Valox 310-SEO zero gap |
|---|---|---|---|
| Example 3 | — | >40 min | 4 |
| Example 3 | 5% methacrylated PVF 7/95E (Ex 1) | >40 min | 53 |
| Example 3 | 10% methacrylated PVF 7/95E (Ex 1) | >40 min | 131 |
| Example 4 | — | 40 min | 0 |
| Example 4 | 5% methacrylated PVF 7/95E (Ex 1) | 40 min | 49 |
| Example 3 | — | >40 min | 3 |
| Example 3 | 5% acrylated PVF 7/95E (Ex 2) | >40 min | 27 |
| Example 4 | — | 40 min | 0 |
| Example 4 | 5% acrylated PVF 7/95E (Ex 2) | 40 min | 30 |
| Example 5 | — | >2 hr | 0 |
| Example 5 | 5% methacrylated PVF 7/95E (Ex 1) | >2 hr | 9 |

These results show the remarkable improvement in Tensile Shear Strength resulting from addition of the methacrylated or acrylated polyvinyl formal resin.

Heat-curable, as opposed to ultraviolet light-curable, formulations were employed in bonding the Valox 310-SEO lapshears because this polyester resin is a filled opaque product which is impenetrable to ultraviolet light and so adhesion to another identical surface of Valox 310-SEO was measured following curing for 2 hr at 120° C. However ultraviolet light-curable compositions are also within the scope of this invention. For example, the addition of 2.0% dimethoxy-2-phenyl acetophenone to the formulation of Example 3 gives an ultraviolet light-curable composition.

The commercially available compounds mentioned herein can be obtained from Monsanto Company, 800N, Lindbergh Blvd., St. Louis, Mo. 63167, U.S.A.; Inolex Chemical Company, Jackson & Swanson Sts., Philadelphia, Pa. 19148, U.S.A.; Hans Rhan & Co., Dorflistrasse 120, CH - 8050, Zurich, Switzerland; Diamond Shamarock Corp., P.O. Box 2386R, Morristown, N.J. 07960, U.S.A.; U.C.B., Chemical Sector, Speciality Chemicals Division, Rue D'Anderlecht 33, B-1620, Drogenbos, Belgium, and General Electric Co., Plastics Division, 1, Plastics Ave., Pittsfield, Mass. 01201, U. S.A. as specified.

I claim:

1. An acrylate- or methacrylate-substituted polyvinyl acetal resin of formula I:

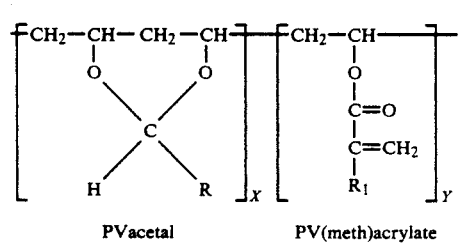

-continued $$\left[\begin{array}{c} CH_2-CH- \\ | \\ O \\ | \\ C=O \\ | \\ CH_3 \end{array}\right]_Z$$

PVacetate wherein the weight percentages of the X, Y and Z groups are variable,

R is a hydrogen atom or an alkyl group, and

R$_1$ is a hydrogen atom or a methyl group.

2. A resin of formula I as claimed in claim 1 wherein the weight percentages of the X, Y and Z groups are in the range 54 to 70% X, 10 to 36% Y, and 0 to 20% Z.

3. A method of producing an acrylate- or methacrylate-substituted polyvinyl acetal resin of formula I as defined in claim 1 wherein a polyvinyl acetal resin of formula II:

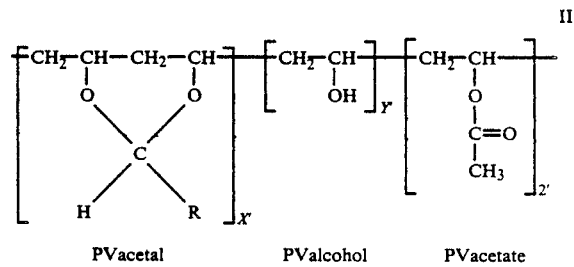

in which the weight percentages of the X', Y' and Z' groups are variable, and R is an hydrogen atom or an alkyl group; is acrylated or methacrylated to produce an acrylate- or methacrylate-substituted polyvinyl acetal resin of formula I.

4. A method as claimed in claim 3 wherein a resin of formula II is used in which the weight percentages of the said X', Y' and Z' groups are in the range 68 to 88% X', 6 to 19% Y' and 1 to 26% Z'.

5. A method as claimed in claim 3 wherein the resin of formula II has a molecular weight of between 350 and 3500.

6. A method as claimed in claim 3 wherein the said polyvinyl acetal resin is a polyvinyl butyral resin.

7. A method as claimed in claim 3 wherein the said polyvinyl acetal resin is a polyvinyl formal resin.

8. A method as claimed in claim 7 wherein said polyvinyl formal resin has a weight average degree of polymerization of approximately 350 and weight percentages of approximately $X'=82\%$, $Y'=6\%$ and $Z'=12\%$.

9. A method as in claim 5 wherein said molecular weight is in the range of between 350 and 900.

10. A method as in claim 3 wherein the resin of formula 2 is acrylated or methacrylated with acryloyl chloride or methacryloyl chloride, respectively.

* * * * *